United States Patent [19]

Schwietzer

[11] Patent Number: 5,086,960
[45] Date of Patent: Feb. 11, 1992

[54] GROCERY CART ATTACHMENT

[76] Inventor: Janet Schwietzer, 16456 Marbro Dr., Encino, Calif. 91436

[21] Appl. No.: 640,283

[22] Filed: Dec. 31, 1990

[51] Int. Cl.$^5$ ............................................... B60R 7/00
[52] U.S. Cl. ...................................... 224/277; 40/308; 248/456
[58] Field of Search ...................... 248/455, 456, 441.1; 40/308, 653; 224/277; 280/33.992; 281/42, 45

[56] References Cited

U.S. PATENT DOCUMENTS

| | | | |
|---|---|---|---|
| 2,864,189 | 12/1958 | Campbell | 40/653 X |
| 2,888,761 | 6/1959 | Miller | 40/308 |
| 3,881,267 | 5/1975 | Hicks | 40/308 |
| 4,156,318 | 5/1979 | Economy | 280/33.992 |
| 4,274,567 | 6/1981 | Sawyer | 224/277 X |
| 4,518,140 | 5/1985 | Ferranto | 248/456 |
| 4,583,753 | 4/1986 | Economy | 280/33.992 |
| 4,673,153 | 6/1987 | Hilty et al. | 248/231.8 |
| 4,685,701 | 8/1987 | Amundson et al. | 281/45 X |
| 4,743,050 | 5/1988 | Small | 281/45 |
| 4,938,402 | 7/1990 | Anatra et al. | 224/277 |

Primary Examiner—Ramon O. Ramirez
Attorney, Agent, or Firm—N. J. Aquilino

[57] ABSTRACT

A display holder for attachment to grocery carts including a panel writing surface, cart engaging clamp attached to and a foldable support pivotally attached to the underside of the panel to support the holder on the cart.

9 Claims, 2 Drawing Sheets

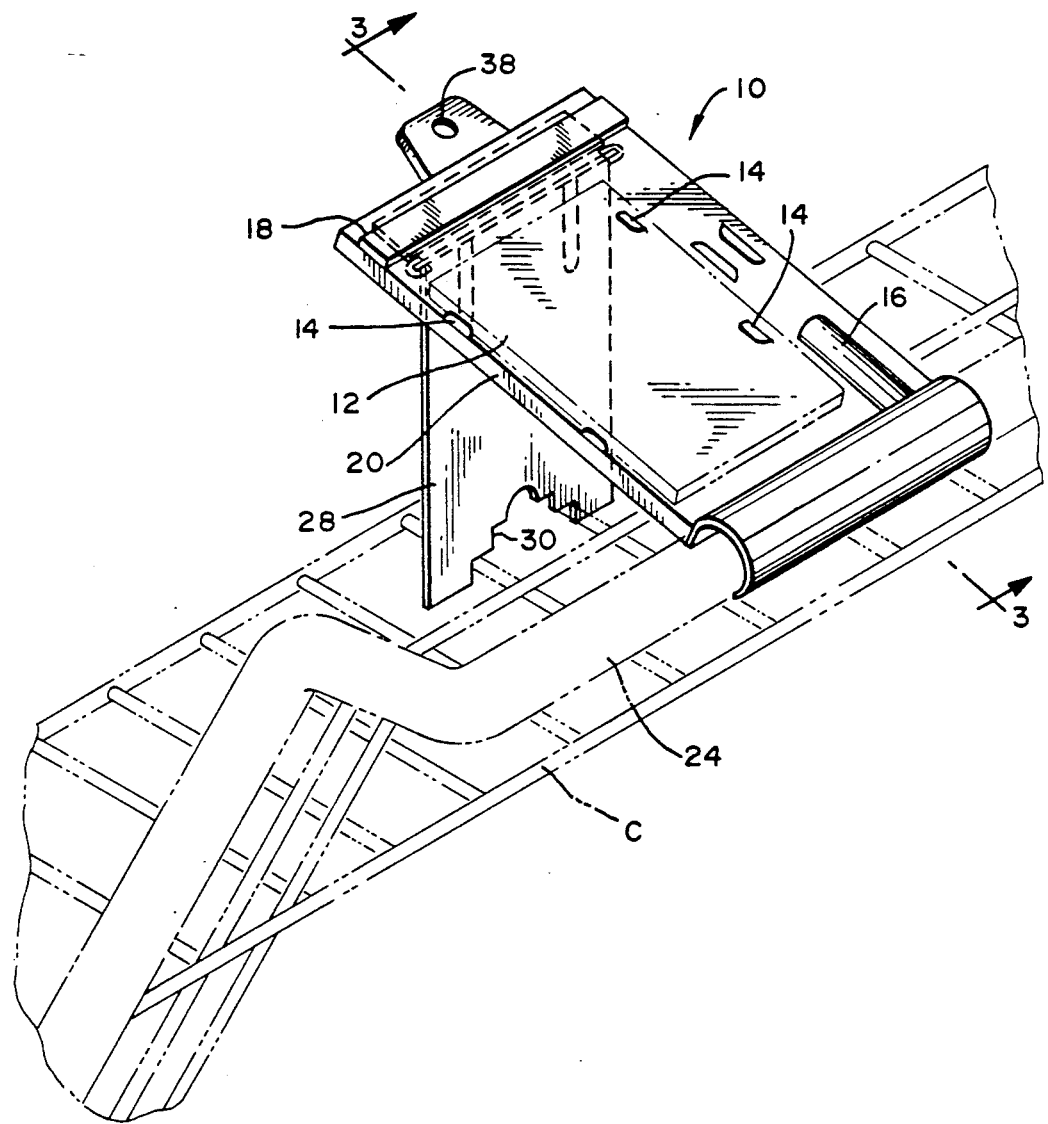
FIG_1

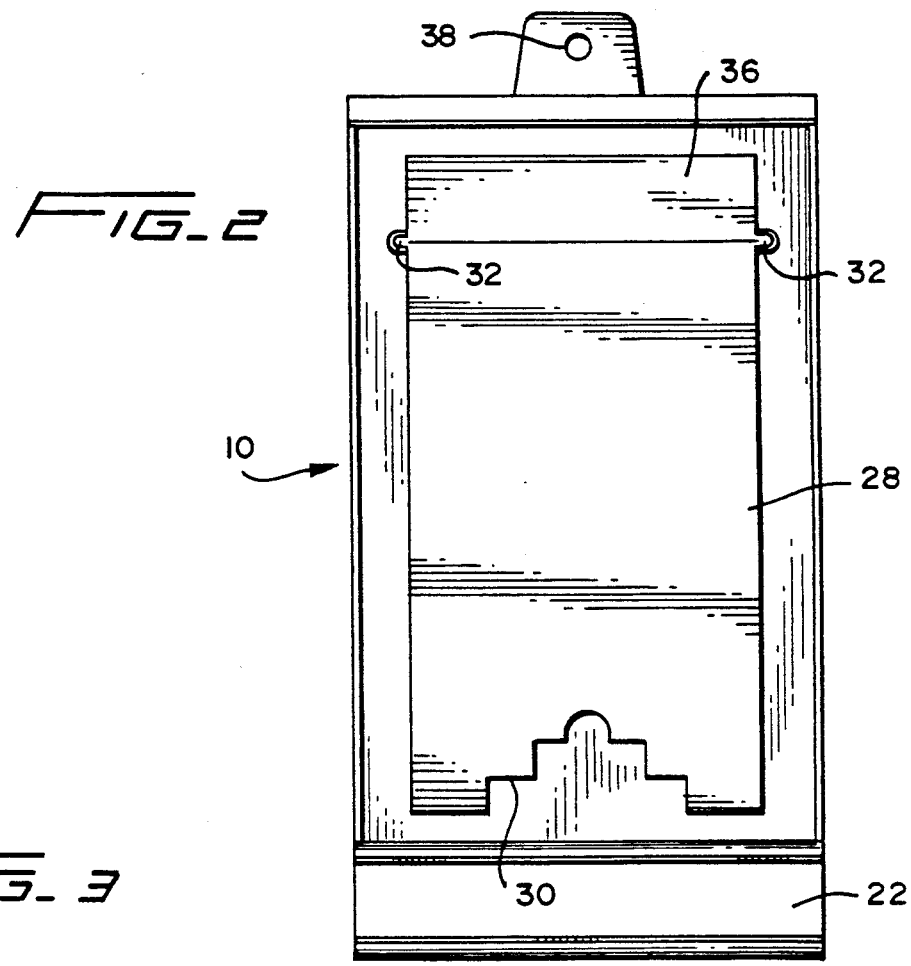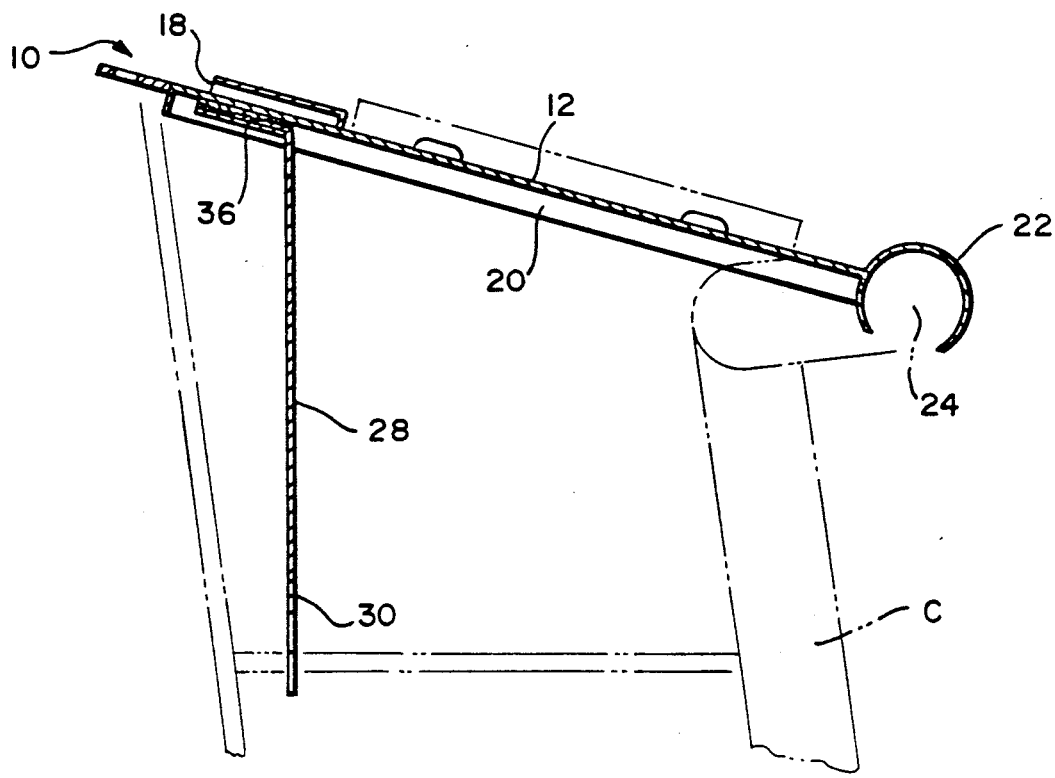

GROCERY CART ATTACHMENT

BACKGROUND AND SUMMARY OF THE INVENTION

The present invention relates to shopping cart attachments, and more particularly to a shopping cart list holder removably attached to the handle of a cart.

It has become common practice for shoppers to buy groceries and other household items at regularly scheduled, periodic intervals rather than going to the store everytime an item is needed. For this reason, many shoppers use grocery lists while shopping to remind them of the products and items they need, and also to enable them to check off an item already bought during the shopping process. Grocery carts do not include any planar surfaces on which to support the lists, thereby requiring the list be hand held. Therefore, the checking off of the various items as they are purchased requires that the user continuously reposition the lists from a holding or storage position to a writing position, and so forth.

Various prior art devices are known for providing a shopping list holder and writing surface, as for example shown in the U.S. Pat. Nos. to Campbell 2,864,189; Hicks 3,881,267; Economy 4,034,539 and 4,156,318; Amundson et al. 4,685,701, among others.

The present invention relates to a shopping cart attachment for holding grocery lists which is designed to fit over the handle and edge of a conventional infant seat arrangement on a grocery cart. The device includes an elongated, semi-circular clasp member integrally formed with the bottom of a planar supporting surface on which the list is kept. The holder also includes a foldable support stand attached to the underside which is designed to engage the gridwork of the grocery cart structure. The device further includes a pencil holder and various mounting structures designed to insure that the list remains in place. The clasp member of the device is flexible, enabling it to be easily snapped on a handle of the grocery cart and also to be easily removed after the shopping process is complete.

DESCRIPTION OF THE DRAWINGS

FIG. 1 is a perspective view of the grocery cart attachment shown attached to a conventional grocery cart.

FIG. 2 is a front elevational view thereof.

FIG. 3 is a side elevational view thereof, taken in section along the lines 3—3 of FIG. 1.

DESCRIPTION OF THE PREFERRED EMBODIMENTS

Referring to the drawings, a preferred embodiment of a shopping list holder 10 is shown attached to a conventional shopping cart C, partially shown in phantom lines. The holder 10, as shown is made of plastic material and includes a flat planar writing surface 12 to support a note pad or other similar type of writing material thereon on which a grocery list is written. The holder 10 includes plastic tabs 14 on the surface of the planar support 12. Preferably the holder 10 is used with a conventional note pad having a plurality of sheets of writing material on a cardboard back panel, which is slid behind the tabs 14 to maintain the pad in place on the holder 10. A writing implement holder 16 supports a pencil, pen or other writing implement. The upper edge of the holder 10 is provided with a slot 18 to receive and store coupons. The holder 10 includes sides 20 which provide rigidity. The lower edge of the holder 10 is formed with a semi-circular longitudinal bottom clamp 22 made of flexible material.

Because of the resilience of the clamp 22, the holder 10 may be rotated about the cart for proper positioning. The semi-circular shape of the bottom clamp 22 is structured to engage the handle 24 of the shopping cart. The underside of the holder 10 includes a foldable rear stand 28 planar in shape having a lower end provided with a plurality of notches 30 which are structured to engage the top cross bars of the grocery cart, infant seat or other part of the cart to which the holder 10 is attached to vertically support the holder 10 on the cart. The different sizes of the notches 30 allow mounting of the holder on a variety of different grocery cart structures. The rear stand 28 is attached to the underside of the holder 10 by hinges 32 which permit the rear stand 28 to be folded back against the underside of the planar support 12 when the holder 10 is not in use.

A strip of magnetic tape 36 is attached to the underside of the rear stand 28 to allow the holder 10 to be mounted on a refrigerator or other similar metal surface. A hole 38, at the top of the holder 10, is also provided, enabling the unit to be hung from a hook or nail on a wall.

It will be appreciated that modifications may be made to the above described structure in keeping within the scope of the following claims.

I claim:

1. A display holder for a grocery cart having a transverse, cylindrical handle and transverse support structure; said display holder comprising:
   a substantially rectangular panel having an upper side defining a writing surface and an underside;
   a semi-cylindrical clamp attached to a lower edge of said rectangular panel, said clamp being resilient and structured to grip said cylindrical handle for mounting the holder on the cart; and
   a planar stand support means having a hinge pivotally attaching the planar stand support means to the underside of said rectangular panel; said planar stand support means including a plurality of notches to accommodate engagement of the transverse members of a variety of sizes of grocery carts.

2. The holder of claim 1 further including a magnet connected to the underside of said stand.

3. The holder of claim 1 further including means for supporting a writing implement and further including means for supporting a pad of writing material.

4. The display holder of claim 1 wherein said plurality of notches are of different sizes.

5. A display holder for a grocery cart having a transverse, cylindrical handle and transverse support structure; said display holder comprising:
   a substantially rectangular panel having an upper side defining a writing surface and an underside;
   an elongated, semi-cylindrical clamp attached to a lower edge and extending the width of said rectangular panel, said clamp being resilient and structured to grip said cart cylindrical handle along the length of said clamp for mounting the holder on the cart; the entire lower edge of said panel being coupled to the cylindrical handle thereby; and
   support means foldably attached to the underside of said rectangular panel for engaging said transverse support structure of said cart to position said writing surface in a writing position on said grocery cart.

6. The holder of claim 5 wherein said support means is a hinged, planar stand pivotally attached to the underside of said rectangular panel, and structured to engage the transverse members of the shopping cart.

7. The holder of claim 6 wherein said planar stand includes a plurality of sized notches to accommodate usage on a variety of sizes of grocery carts.

8. The holder of claim 5 further including a magnet connected to the underside of said stand.

9. The holder of claim 5 further including means for a supporting a writing implement and further including means for supporting a pad of writing material.

* * * * *